H. A. STEBBINS.
TARGET PRACTICE APPARATUS.
APPLICATION FILED MAY 28, 1906.
900,607.
Patented Oct. 6, 1908.
5 SHEETS—SHEET 2.
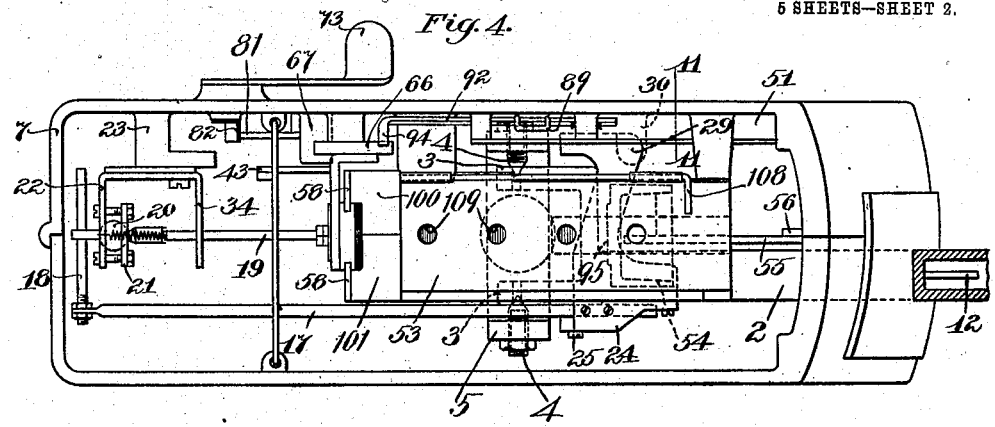
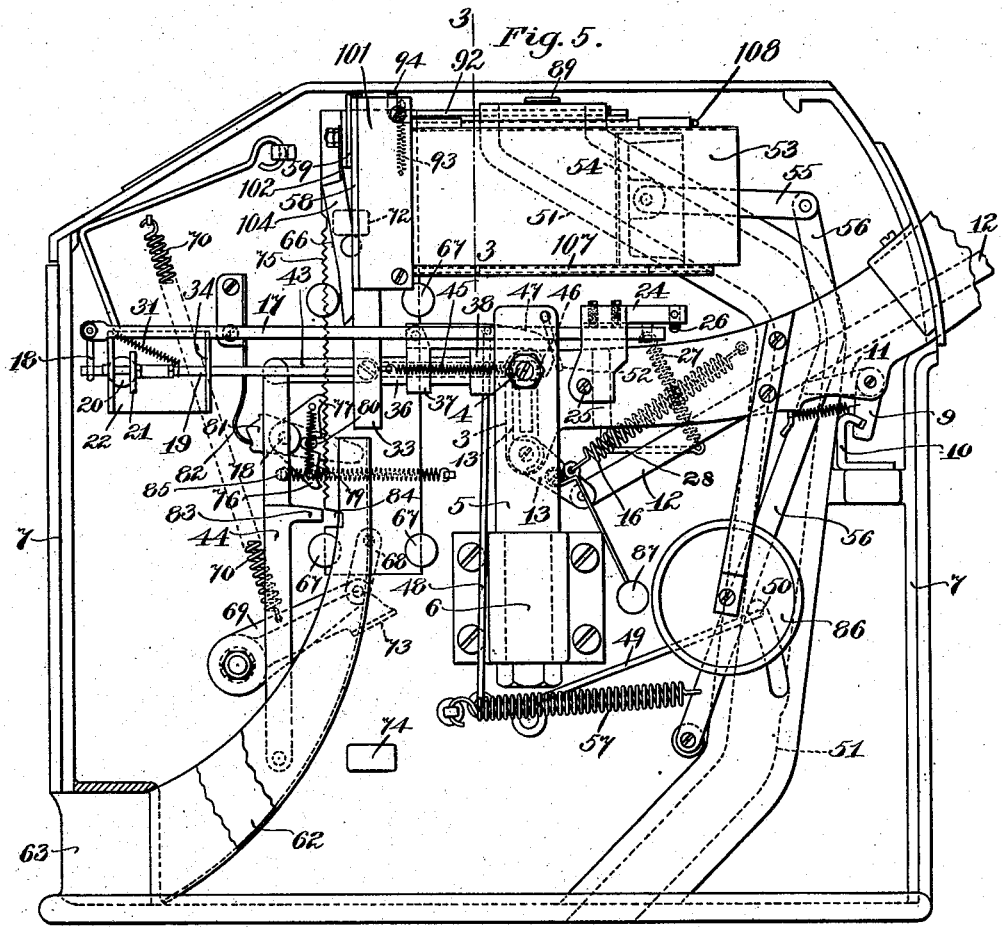
Witnesses:
Horace H. Crossman
Robert H. Kanowler
Inventor:
Henry A. Stebbins
by Emery Booth
Att'ys

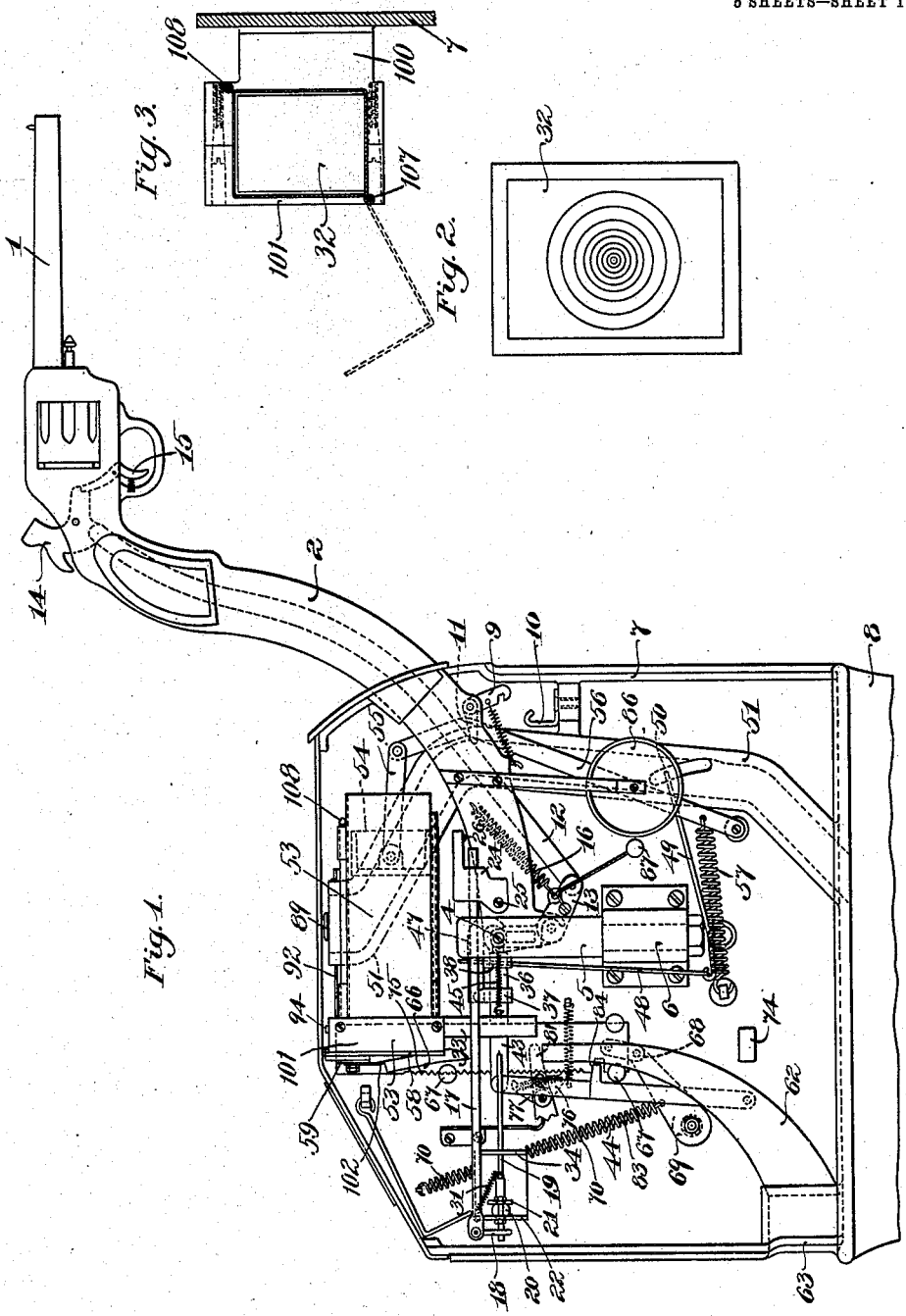

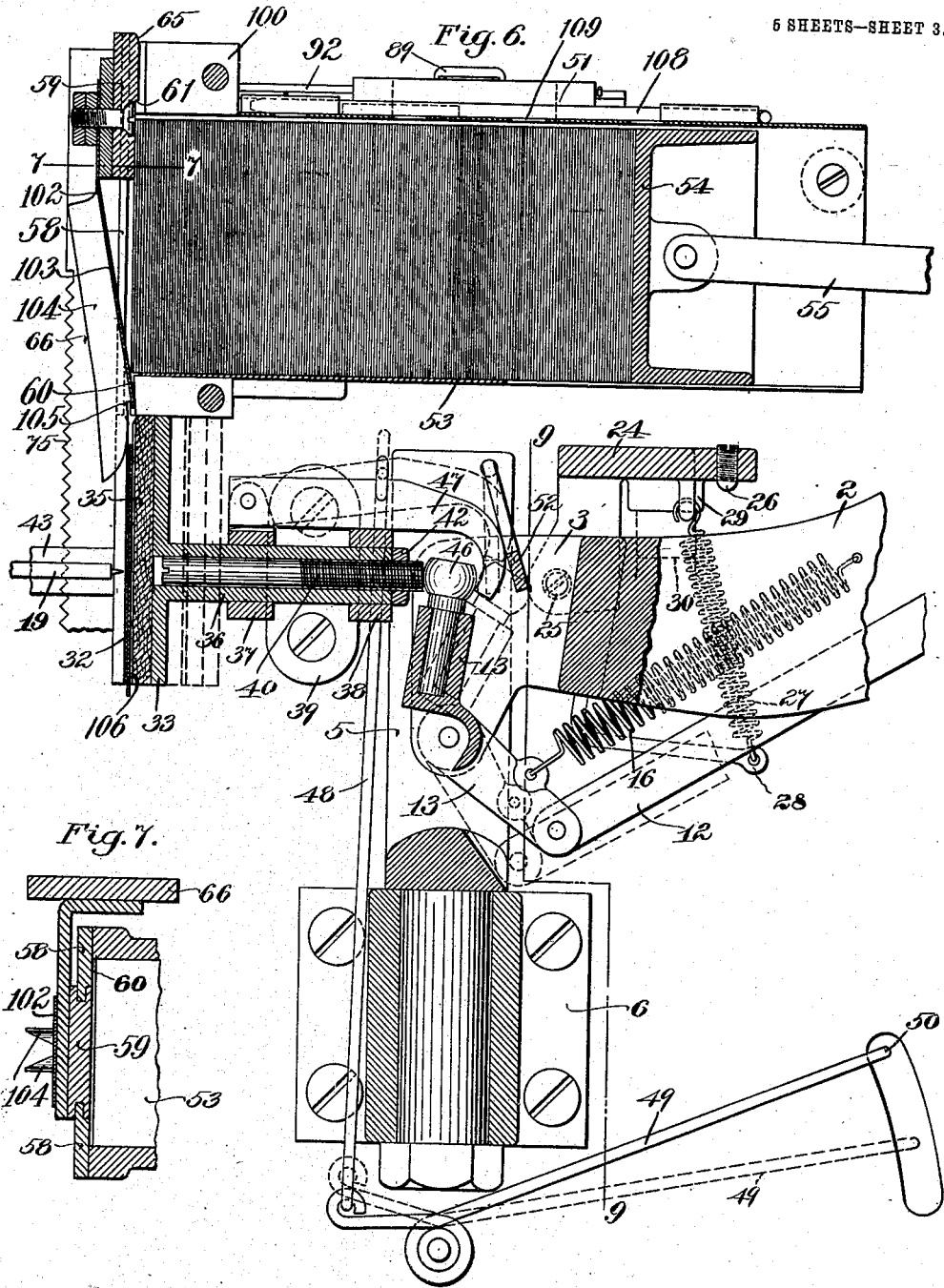

H. A. STEBBINS.
TARGET PRACTICE APPARATUS.
APPLICATION FILED MAY 28, 1906.
900,607.
Patented Oct. 6, 1908.
5 SHEETS—SHEET 4.
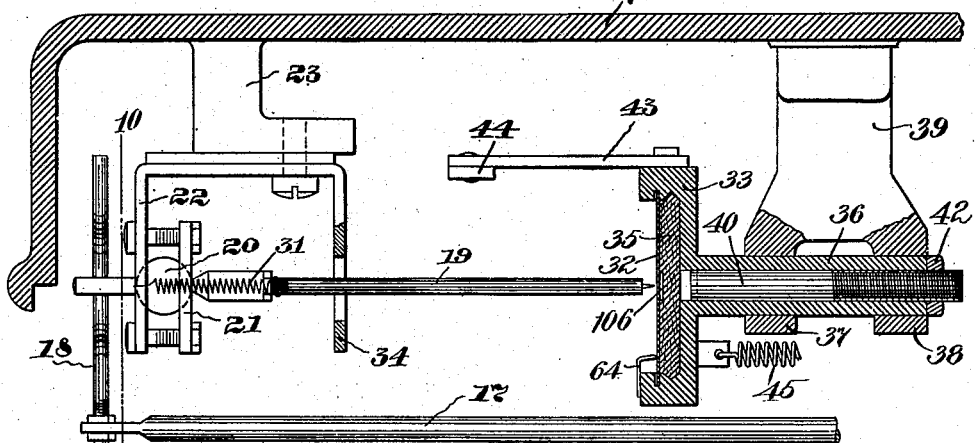
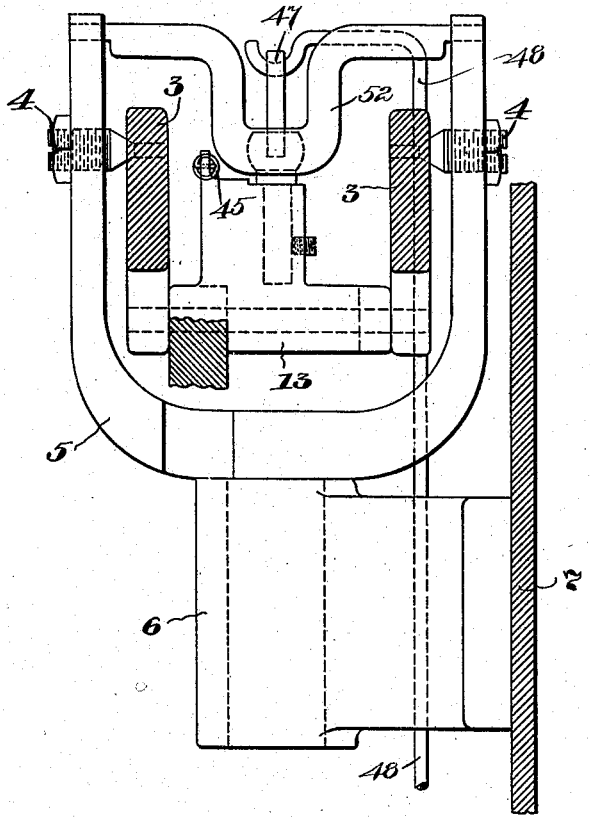
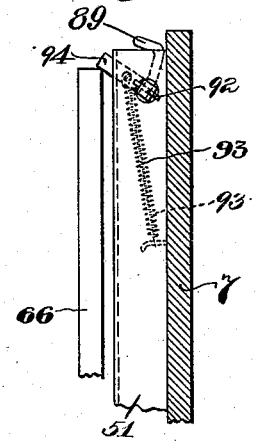
Witnesses:
Horace A. Crosman
Robert H. Kammler
Inventor:
Henry A. Stebbins
by Emery & Booth
Attys.

H. A. STEBBINS.
TARGET PRACTICE APPARATUS.
APPLICATION FILED MAY 28, 1906.
900,607.
Patented Oct. 6, 1908.
5 SHEETS—SHEET 5.
*Fig. 12.*     *Fig. 13.*
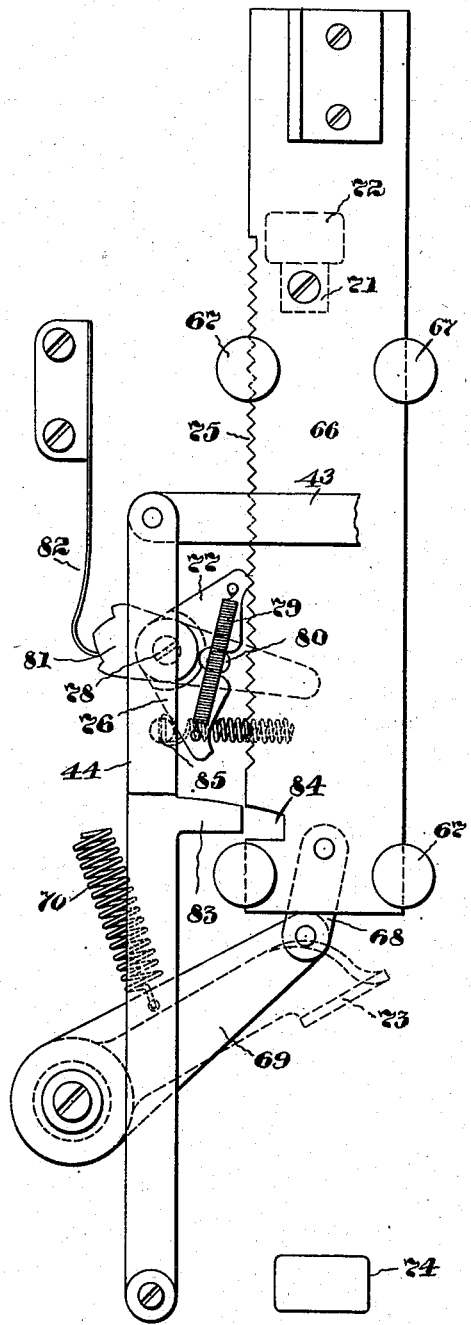 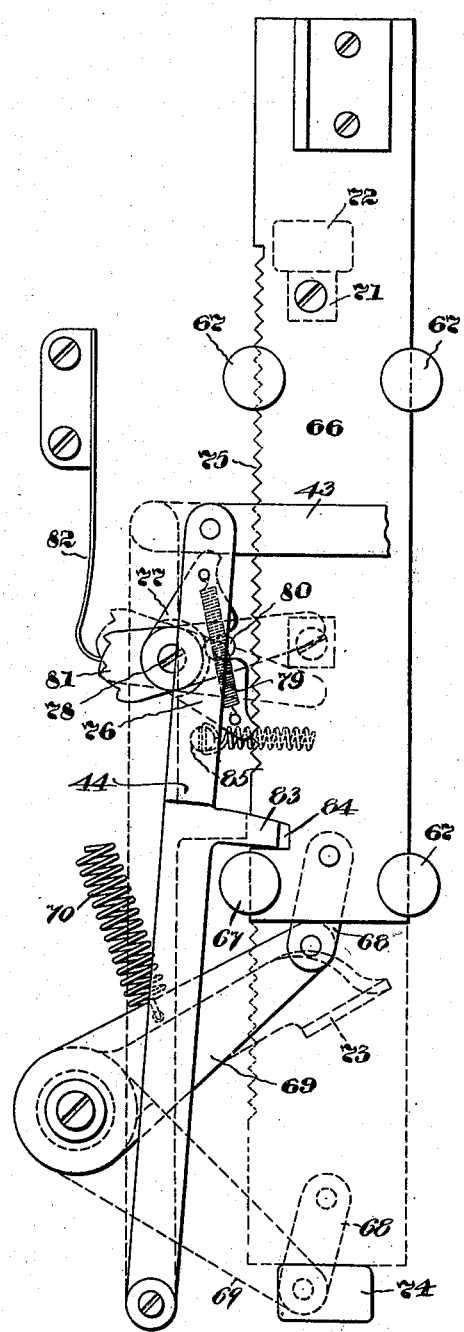
Witnesses:
Horace H. Crossman
Robert H. Kammler
Inventor:
Henry A. Stebbins
by Emery Booth
Att'ys

UNITED STATES PATENT OFFICE.

HENRY A. STEBBINS, OF MALDEN, MASSACHUSETTS, ASSIGNOR TO SUB-TARGET GUN COMPANY, OF SACO, MAINE, A CORPORATION OF MAINE.

TARGET-PRACTICE APPARATUS.

No. 900,607.            Specification of Letters Patent.            Patented Oct. 6, 1908.

Application filed May 23, 1906. Serial No. 319,150.

*To all whom it may concern:*

Be it known that I, HENRY A. STEBBINS, a citizen of the United States, residing at Malden, in the county of Middlesex and State of Massachusetts, have invented an Improvement in Target-Practice Apparatus, of which the following description, in connection with the accompanying drawings, is a specification, like letters on the drawings representing like parts.

This invention relates to target practice apparatus, being particularly though not exclusively concerned with coin-controlled devices for permitting the practice of marksmanship.

There is herein illustrated and described one form of this invention as applied to a device intended for the practice of marksmanship wherein is employed an aiming device so mounted as to be capable of an aiming movement with reference to a main target and provided with a suitable follower to follow the aiming movement thereof and also with suitable recording devices to record the position of the follower upon the sub- or miniature target at the time of simulated firing, the object thereof being the accurate record upon the sub-target of the aim taken at the main target without the issuance of any projectile from the aiming device.

There is also herein disclosed suitable coin-controlled mechanism to permit movement of the aiming device and the record of the aim thereof only upon the insertion of a coin, check, or other suitable operating member; also, suitable target feeding devices for ejecting a marked sub-target from the apparatus and delivering the same within the grasp of the marksman and for placing a fresh sub-target from the target magazine in recording position ready for another record or shot.

This invention will be best understood from the following description taken in connection with the accompanying illustration of one specific embodiment which is herein submitted for illustrative purposes only, while its scope will be more particularly pointed out in the appended claims.

In the drawings,—Figure 1 is a side elevation of one form of coin-controlled target practice apparatus, constructed according to this invention, with the pedestal partly removed and one side of the housing or casing withdrawn to show the contained parts; Fig. 2 shows a full size sub- or miniature target upon which the aim is recorded; Fig. 3 is a transverse section on the line 3—3 in Fig. 5 to show the target magazine; Fig. 4 is a plan view partially broken away showing on a larger scale the follower parts and the target magazine; Fig. 5 is an elevation on the same scale as Fig. 3, partially broken away, with the side of the casing removed to show the operating parts; Fig. 6 is a vertical section on a still larger scale showing the target magazine and the target feeding and locking devices; Fig. 7 is a section on the line 7—7 in Fig. 6 showing the relation of the feed slide to the target magazine; Fig. 8 is a plan view partly in section showing the recording needle and its relation to the target; Fig. 9 is a section on the line 9—9, Fig. 6; Fig. 10 is a section taken on line 10—10, Fig. 8; Fig. 11 is an enlarged section on line 11—11, Fig. 4, showing the slot closer, and Figs. 12 and 13 show in side elevation and in different positions respectively the feeding mechanism.

Referring to Fig. 1, there is shown a coin-controlled target practice apparatus having an aiming device, such as the revolver 1, provided with a rearwardly extending arm 2 secured to the revolver butt. The said arm is provided (Figs. 4 and 6) with a pair of rearwardly extending ears 3, which are mounted upon the horizontal trunnions 4 (Fig. 9), secured to the vertical bifurcated support 5, the latter in turn pivoted in the underlying bracket 6 to afford the arm and revolver a swinging movement in a horizontal plane. A universal aiming movement is thereby provided for the revolver when grasped by the marksman and aimed at a distant target, movements in a vertical plane being permitted about the trunnions 4 and in a horizontal plane about its swiveled support in the bracket 6. The latter is fixedly secured to and within the casing 7 which may be mounted upon a standard or other support of suitable height, the upper part only of such standard being indicated at 8 in Fig. 1.

The revolver is ordinarily held (as in Fig. 5) from aiming movement by a spring latch 9 engaging the stationary catch 10, said latch having a releasing finger 11 spring-pressed against the lower side of the resetting rod 12 to be moved thereby, which latter resets the recording devices and, passing through the hollow interior of the arm 2, connects the target actuator 13 (Figs. 5 and 6) with the revolver hammer 14 (Fig. 1), with which and the trigger 15 the revolver is provided, although in other respects it may be either a dummy or an actual firearm. The retractile spring 16 (Figs. 1, 5 and 6) secured to the arm 2 tends normally to draw the actuator 13 forward and to seat the revolver hammer. When the revolver is cocked, the rod 12 pushes the actuator backward against the tension of the spring and which, by the depression of its lower end in moving about the pivot of the actuator 13, throws the finger 11 downward, the latter releasing the latch 9 (as in Fig. 1). Free aiming movement is then permitted until the trigger is pulled to release the hammer and the resetting rod, when the latch 9 again snaps under the catch as soon as the revolver is depressed or dropped.

Connected (Figs. 4 and 5) to follow the movement of the revolver is the rearwardly extending follower rod 17, adjustably secured at its rear (Figs. 8 and 9) to the threaded end of a crooked finger 18. The bend or depression in the latter underlies the rearwardly projecting shank of the pointed recording needle 19, the latter being also capable of universal movement and, for that purpose, having a spherical head 20, seated (Fig. 8) between and within the removable cap 21 and the bracket 22, the latter being secured to the lug 23 upon the casing 7. To connect the follower rod 17 with the revolver, the rod is adjustably and removably secured (Figs. 4 and 5) at its forward end to a tilting frame 24, the latter being pivotally secured by the horizontal pivot screws 25 to the two branches of the arm 2 so as to be permitted a limited up-and-down oscillating movement thereon under conditions to be referred to. The frame 24 has an adjustable distance pin 26 which is held to a seat against the arm 2 when the revolver is raised (as in Fig. 1) by means of the tension spring 27 connected between the frame and a finger 28 on the arm.

The tilting frame 24 is provided (Figs. 4 and 6) with an extension 29 which seats over and against the stationary casing-ledge 30 when the revolver is lowered and locked, the arm 2 being then withdrawn from the distance pin 26 (as in Figs. 5 and 6). When the revolver is raised for aiming, the pin 26 again seats itself against the arm 2 and, being held in contact therewith by the spring 27, the tilting frame and follower rod are caused to move with the arm as a unit and directly to transmit aiming movement through the finger 18 to the needle 19.

During all movements of the follower rod the needle is caused to remain seated in the bend of the finger 18 by the tension spring 31 (Figs. 4, 5 and 8) and the needle point therefore reproduces with reference to any stationary object, such as the adjacent miniature or sub-target here employed, the exact aiming movement of the revolver relatively to the main target, although the actual needle movement is in an increased ratio. The sub-target 32 (see Fig. 2) is carried (Figs. 6 and 8) in a suitable target holder 33 to face the point of the needle, and, at the time of simulated firing, as hereinafter described, is forced against the needle point, to permanently record the position of the needle and therefore the aim of the revolver at that time.

In order to limit the range of needle movement approximately to the face of the target while permitting excess movement of the revolver when desired, the needle is caused to pass (Fig. 8) through a limiting frame 34 having a circular aperture and secured to the bracket 23, the needle thereby having its movement limited when the revolver undergoes excessive deflection, the yielding connection between the needle and the revolver permitting this excess movement of the latter over the former. Thus, any excessive upward deflection of the revolver temporarily withdraws the finger 18 from the needle shank when the latter meets the limiting walls of the frame 34. Excessive downward deflection permits the withdrawal of the arm 2 from the frame 24 as the frame extension 29 seats itself against the casing ledge 30. This acts temporarily to break the connection between the arm and the follower permitting subsequent excessive revolver movement to take place without possibility of injury either to the rod 17 or needle 19. If the revolver is lowered below this point, the pivotal connections 25 being also depressed, subsequent lowering of the revolver acts to lower the previously raised end of the follower 17 and slightly to raise the previously lowered needle point to an approximate mid-position, which therefore is the needle position when the revolver is lowered and locked. Excessive lateral deflection of the revolver permits the temporary unseating of the needle shank from the bottom of the bend in the finger 18, the follower rod again assuming control of the needle when the line of revolver sight reenters its field of the main target.

To effect initial adjustment of the apparatus, the revolver, having been cocked and unlocked, is first accurately sighted at the bull's-eye of the main target, and, if necessary, the needle is then adjusted to point also to the bull's-eye of the sub-target, adjustment in a vertical plane being effected by the adjustable distance pin 26 upon the tilting frame and in a horizontal position by the adjustable connection between the bent finger 18 and the follower rod 17.

The sub-target when in position (Figs. 6 and 8) is held, with its face presented to the needle point, in two parallel vertical slots in the sub-target holder 33, the latter herein comprising a holder frame, preferably faced with a wall or pad 35 of cushioning material, such as leather, to yieldably press the target against the needle point when record is made. The holder frame has projecting from its back the tubular stem 36 adapted to slide in the guide supports 37 and 38, the latter carried by the forked bracket 39 (Figs. 6 and 8) secured to the side of the casing 7.

Projecting from the end of the holder stem is the target holder pin 40, which has threaded engagement with the stem so that the extent of its projection from the end of the stem may be accurately adjusted through the face of the sub-target holder, a lock nut 42 being employed to retain it securely in its adjusted position which position may thus be accurately maintained with reference to the feeding slots of the overhead magazine to be described. Movement of the target holder towards the needle takes place against the tension of the sub-target holder spring 45 (Fig. 5) connecting the holder to the actuator 13, said spring acting therefore to draw the holder toward the position shown in dotted lines in Fig. 6, maintaining the target holder pin 40 in contact with the head of the hammer 46, the latter being adjustably secured (Fig. 9) to the target actuator 13.

In Fig. 6 there is shown in full lines the recording mechanism in the uncocked position of the revolver. The target hammer 46 is held locked, and also the revolver hammer and the sub-target holder, by means of the hooked locking lever 47 pivoted to the guide support 37 and having its hooked end overlying the hammer end to prevent cocking movement thereof.

Secured to the locking lever 47 is a vertical releasing rod 48, the lower end of which is secured to one arm of a trip lever 49, the opposite arm of the trip lever having an inturned end 50, which normally lies across the coin slot 51 (Figs. 1 and 5). When the coin is inserted at the mouth of the slot at the top of the casing, it passes forwardly and then downwardly through the slot into an underlying coin receptacle which latter may be a part of or within the pedestal 8. On its passage, however, it trips the lever 49 (see dotted lines Fig. 6,) lifts the rod 48 and locking lever 47 into the dotted line position (Fig. 6) and permits the swinging catch 52 to swing beneath the tip of the locking lever, as shown in dotted lines, holding it elevated and maintaining the mechanism unlocked ready for subsequent cocking. If the revolver is then cocked, the rod 12 is pushed downwardly and backwardly moving the actuator 13 against the tension of spring 16 to withdraw the sub-target hammer 46 to the dotted line position (Fig. 6), carrying with it the pivoted catch 52 out from under the latch lever and permitting the target holder tension spring 45 to draw the target holder to dotted line position with the target holder pin 40 seated against the hammer head. After the revolver has been aimed and the trigger pulled in the act of simulated firing, the target hammer 46, thereby released, is forced by the spring 16 against the holder pin 40 to throw the holder with its contained sub-target towards the needle point. The momentum of the holder permits a slight overthrow beyond its normal position (full lines in Fig. 6) to cause the sub-target to meet the needle point 8, producing a permanent record of the revolver aim by the resultant puncture of the sub-target face; the holder thereafter being immediately retracted by the tension spring 45 to its normal or full line position in Fig. 6. When the revolver is fired and record made the tip of the latch lever 47 drops between the hammer head and the catch 52, the parts again assume the normal position and remain locked as shown in Fig. 6 until another coin passes through the slot.

After the record has been made, the marked sub-target may be ejected from the apparatus and delivered to a position within the grasp of the operator by the following described means, which suffice also to present in proper position a fresh sub-target for a new trial of marksmanship. A target magazine is provided of any suitable construction but preferably as here shown in the form of a sheet metal casing 53 of rectangular cross-sectional shape and having its forward end (Figs. 1, 3 and 5) entering between the stationary bracket 100 and the bracket cap 101, which is clamped thereto. The magazine is secured rigidly to the side casing 7 in a horizontal position with its mouth or forward end above the target holder. In this position it is adapted to receive a supply of targets maintained in an upright position which, through the provision of suitable feeding devices, may be individually fed from the mouth or exit end of the magazine into the target holder beneath. The targets are pressed toward the exit end of the magazine by means of the presser block 54, acting from the rear of the magazine and pivoted to the link 55, the latter being connected with the upright lever arm 56 pivoted to the lower part of the casing. The presser block (Figs. 5 and 6) is pressed against the targets by means of the tension spring 57, attached at one end to the lever 56 and at the other to a stud in the casing walls.

The construction of the magazine presents features of novelty in that it permits among other things the quick and ready insertion of a fresh supply of targets. To facilitate this step the outer side and top of the sheet metal casing are wholly outside of the clamping bracket 100 the top being hinged at 107 (see Fig. 3) so that the entire side and top of the casing may be swung outwardly and downwardly. When it is desired to fill the magazine with targets the casing is opened about the hinge and a lot or stack of the targets placed in position upon the casing bottom. The hinged sides are then swung back into position and locked by means of the sliding latch pin 108. This opening of the magazine casing for the insertion of the targets obviates disadvantages which attach to a magazine having one wall or face only open or removable. Under such conditions it has been found that a hurried insertion of the targets is apt to roughen up or tear the edges or otherwise so injuriously affect the targets that they occasionally fail in that alinement which is necessary for feeding and accurate recording. The top of the casing has a number of perforations 109 lengthwise the same, so that its condition as to fullness or emptiness may be ascertained without opening the same.

The target nearest the exit end of the magazine presses against the sides of the plates 58 (Fig. 7) which overlie the end of the magazine feed-way and against the face of the target feed slide 59, the latter being vertically slidable by a grooved connection upon the said plates 58. The under wall of the magazine recedes beneath the outermost sub-target for a distance somewhat greater than the thickness of the target. The outermost target is frictionally held by the pressure of the feed slide over the channel 60 formed by this receding portion so that when fed downward by the feed slide 59 it will be pushed through the said channel into the grooves of the target holder (Fig. 8), which grooves are normally directly in line with the outermost target, and are appropriately flared at their tops to insure the entrance of the target therein. To force the targets downwardly, a shoulder 61 of a depth somewhat less than the thickness of the target, is formed on the inner face of the feed slide and in the elevated position of the slide, overlies the top of the foremost target. On the downward movement of the slide the shoulder engages the upper edge thereof, and on further movement forces the target downward into the holder.

Secured to the front of the feed slide 59 (Fig. 6) is a depending inclined resilient pusher member 102 which on the depression of the feed slide precedes the target entering the holder and engages the upper edge of the preceding target therein which preceding target is thus ejected from the target holder and caused to drop into the chute 62 (Figs. 1 and 5) underlying the target holder. The ejected target gravitates down the chute toward the bottom of the casing and into the flared or open mouth 63 from which it may be readily and manually withdrawn. The pusher member consists merely of a narrow strip 103 of sheet metal provided for a portion of its length with flanged sides 104. Each side flange at its lower end is beveled or rounded toward a notch 105 into which the upper edge of the card enters on depression of the slide. In the face of the target pad there is formed (Figs. 6 and 8) a vertical groove 106 which prevents the tip of the pusher when depressed from digging into the leather of the pad. If the needle lies in the path of the pusher when the latter is depressed, it is thrust aside without injury by the flanged sides 104.

While the entrance of the fresh target into the holder might be relied upon to eject the preceding target from the holder, it being impossible to provide targets always of identically the same thickness, such mode of ejection is not always certain. Through the provision of the described coöperating features the preceding target is positively ejected by the pusher member in advance of and without interference with the succeeding target, the movement and action of the pusher plate being positive and certain under all conditions.

The target delivered to the holder is prevented from accidentally moving beyond the exact position where it is left by the feed slide by means of a spring clip 64, which frictionally holds it in the intended position for receiving its record. The upper edge 65 of the feed slide face is rounded or beveled so that after delivering the target to the holder, the feed slide in returning rides over the face of the next target to its elevated position, the upper edge of the target being forced by the pressure back of it under the shoulder 61 as the latter slips by and the feeding apparatus is then ready for a repetition of the operation.

The resilient mounting of the pusher plate permits it to yield outwardly on its returning or rising movement so that it has no tendency to displace the freshly positioned target in the holder, which target of course must be, for purposes of accurate record, left in a fixed and predetermined position by the feed slide.

For the reciprocation of the feed slide, the same is secured to the vertical slide 66, slidable (Figs. 12 and 13) in the two sets of notched guiding pins 67. The slide is connected at its lower end by the link 68 to the pivoted arm 69, the latter acting normally through the tension spring 70 to hold the slide in its upper position, which latter is determined by contact between the stop piece 71 on the slide and the lug 72 upon the casing. The downward movement of the slide is effected by means of the exterior hand lever 73 (Fig. 4) connected to the interior pivoted arm 69, the downward slide movement being limited by engagement of the slide with the stop lug 74 on the casing.

In order to prevent any movement of the revolver after firing, from displacing the target holder from its normal position and disturbing the alinement thereof with the target feeding channel in the magazine, the spherical target hammer head, when the revolver is uncocked, is concentric with the center of the revolver gyration, that is, at the intersection of its horizontal and vertical pivotal axes. Therefore, any movement of the revolver when uncocked, cannot displace the sub-target holder to interfere with the introduction and ejection of the sub-targets, should feeding be attempted while the revolver is still held in the hand.

In order to prevent an incomplete cycle of operations of the target feeding apparatus which might occur were the slide 66 only partially lowered, as by a partial depression only of the hand lever 73, and therefore to compel the completion of the feeding movement when once begun, there is provided means for preventing the reverse movement of the feeding mechanism until the vertical slide has reached the limit of its downward stroke and for preventing any subsequent downward movement after its upward stroke has begun.

Referring to Figs. 12 and 13, the slide 66 is provided with a series of ratchet teeth 75 which engage the pawl 76 on downward movement and the pawl 77 on upward movement. Said pawls are pivoted for independent movement upon the pin or stud 78, fixed to the casing, but are normally drawn together by the spring 79 toward the position shown in Fig. 12, and into contact with an intervening pin 80, carried by the pivoted pawl arm 81. The pawl arm 81 has a notched end against which presses the end of a stationary leaf spring 82, thereby holding the arm either in the position shown in Fig. 12 or that shown in Fig. 13.

When the revolver is locked and uncocked, awaiting the insertion of a coin, the feed locking parts are in the full line position shown in Fig. 12, where the pawl 77 engages with and prevents downward or feeding movement of the slide 66. Connected to the target holder 33 by the link 43 (Figs. 5 and 8) to move forward and backward with the holder is the upright feed latching and tripping lever 44 the lower end of which is pivoted to the frame. The latch lever has a lug 83 adapted to enter a notch 84 in the edge of the feed slide and when within the same to prevent feeding movement thereof. When the revolver is cocked, the latch lever is moved with the target holder to cause the lug 83 to enter the notch 84, locking the feed slide. Simultaneously the tripping pin 85, also carried by the latch lever is caused to move against the edge of the pawl 76 to force the pawl lever 81 from the position shown in Fig. 12 to that shown in Fig. 13, the spring 82 completing the movement of the pawl lever and temporarily retaining it in its new position. The movement of the lever 81 throws the pawl 76 into engagement and the pawl 77 out of engagement with the slide 66. When the revolver has been fired, the latch lever is moved with the target holder to withdraw the locking lug from the notch in the slide and the latter is then free to be lowered by the operating handle 73 to feed a fresh sub-target and eject the preceding one. When the slide reaches the lower limit of movement, which is determined by the stop 74, the stop 71 on the back of the slide strikes the pawl lever 81 and throws it back to the position shown in Fig. 12, thereby throwing the pawl 76 out of and the pawl 77 into engagement with the ratchet teeth thereby permitting upward movement of the feeding mechanism, and upward movement only, to follow. Thus it will be seen that at no position is the feeding slide 66 capable of a retrograde movement, but the feeding operation once begun, must be completed. It will also be noticed that the feeding operation is not possible until completion of firing and that but one sub-target can then be fed.

When in operation, the casing 7 suitably supported, is arranged with reference to a main target so that the revolver may be aimed thereat. A standard target may be used at the standard distance, or, if desired, the same may be proportionately reduced. The sub-target is preferably a reproduction of the main target, but appropriately reduced, so that the gyrations of the needle accurately reproduce the gyrations of the line of revolver sight with reference to the distant target.

The apparatus being locked as shown in Figs. 5 and 6, the coin is inserted in the slot, causing the release of the locking lever 47. The revolver may then be cocked, which causes the release of the latch 9, freeing the instrument for aiming purposes and further sets the recording devices in the dotted line position shown in Fig. 6. As the marksman now aims at the main target the needle correctly reproduces with reference to the face of the adjacent sub-target the line of revolver-sight with reference to the main target, When the trigger 15 is pulled the target holder is thrown to press the sub-target against the needle point to record the needle position and consequently the revolver aim, the feeding mechanism being simultaneously unlocked by a movement of the feed locking lever 44. The pull of the trigger and the completion of the record is audibly signalized by the striking of a bell 86, the hammer 87 for which is movable with the actuator 13. The operating lever 73 may now be moved to eject the punctured sub-target into the mouth 63 of the target chute and to substitute for the ejected target a fresh one from the target magazine in preparation for a repetition of the trial of marksmanship. If desired, the same target may be employed to receive one or more records before being ejected by the operation of the feeding mechanism.

To prevent the cocking of the firearm after the feeding mechanism has once been started and before it has completed its feeding movement, which cocking could be accomplished on the insertion of a fresh coin, the mouth of the coin slot is obstructed by the bent wire gate 89 as soon as the operating lever 73 is depressed. This gate (Figs. 4 and 11) is secured to the rock shaft or rod 92, the latter being normally turned to maintain the gate closed, as shown in Fig. 4, by means of a tension spring 93 (Fig. 11) connected to the outturned end 94 of the rock shaft. The outturned end of the shaft lies within the path of the slide 66 so that when the latter has completed its movement and rises to its normal position, it strikes the end 94, turning the rock shaft against the tension of the spring 93 to open the gate, in which position the latter is maintained until the feeding mechanism is again operated.

In case the entire supply of targets in the magazine becomes exhausted, on the transfer therefrom of the last target to the target holder, the pressure block 54 moves to permit a projection 95 (Fig. 4) formed on the face thereof to overlie the top edge of feed slide 59 and prevent the rise thereof. The maintenance of the feed slide in its depressed position, which is insured until the instrument is opened and the supply of sub-targets replenished, maintains the mouth of the coin slot closed and prevents thereby further operation of the apparatus until a fresh supply of targets has been introduced.

It will be obvious that my invention is in no respect limited to the details herein shown, or to the form and arrangement of parts, the same being here selected and described in detail for the sole purpose of disclosing one practical embodiment of my invention. It is to be understood that the latter is capable of embodiment in many other forms unnecessary to describe, and moreover that various individual features herein described are capable of use in other combinations and other connections unnecessary here to refer to.

Claims—

1. A target practice apparatus having an aiming device for aiming at a distant target, means for reproducing the aim thereat with reference to, and recording the same upon, a miniature target or the like, a stationary target magazine for holding a plurality of such miniature targets, and means for presenting said targets successively in recording position.

2. A target practice apparatus having an aiming device for aiming at a distant target, means for reproducing the aim thereat with reference to, and recording the same upon, a miniature target or the like, a magazine for holding a plurality of such miniature targets, said magazine comprising a holding receptacle in which the individual targets are held in bulk, one against another, and means for separating and feeding the said targets singly from the magazine to their recording position.

3. A target practice apparatus having an aiming device for aiming at a distant target, means for reproducing the aim thereat with reference to, and recording the same upon, a miniature target or the like, a magazine for holding a plurality of such miniature targets, means near the exit end of said magazine for drawing said targets singly therefrom, and means for moving the remainder of said targets toward said exit end.

4. A target practice apparatus having an aiming device for aiming at a distant target, means for reproducing the aim thereat with reference to, and recording the same upon, a miniature target or the like, means for holding a plurality of said miniature targets in bulk and packed one against another, and means for separating and withdrawing said targets singly from the bulk and transferring it to recording position.

5. A target practice apparatus having an aiming device for aiming at a distant target, means for reproducing the aim thereat with reference to, and recording the same upon, a miniature target or the like, means for holding a plurality of targets, means for moving the same rectilinearly, and means acting transversely the direction of rectilinear movement for withdrawing a target from said holding means.

6. A target practice apparatus having an aiming device for aiming at a distant target, means for reproducing the aim thereat with reference to, and recording the same upon, a miniature target or the like, a magazine for holding a plurality of said targets and permitting their movement horizontally, and means acting vertically for withdrawing a target from said magazine.

7. In an apparatus of the class described, the combination with the aiming device 1, the recording needle 19, the target magazine 53 having provision to receive a stack of individual subtargets and means for feeding said targets singly to recording position relative to said needle.

8. In an apparatus of the class described, the combination of an aiming device, a recording needle 19 for recording the aim thereof, a target magazine 53 adapted to hold a plurality of targets and provided with a presser block 54, and the feed slide 59 for feeding targets from said magazine into operative or recording position relative to said needle.

9. A target practice apparatus having an aiming device for aiming at a distant target, means for reproducing the aim thereat with reference to, and recording the same upon, a miniature target or the like, a magazine comprising a casing having an exit end, a target holder adjacent the exit end thereof, and feeding means for transferring said targets from said magazine to said holder.

10. A target practice apparatus having an aiming device for aiming at a distant target, means for reproducing the aim thereat with reference to, and recording the same upon, a miniature target or the like, a magazine for holding a plurality of said targets, a casing having an exit end, a target holder beneath the exit end thereof, a feeding mechanism for withdrawing said targets singly from the open end of said casing and transferring them to said holder.

11. A target practice apparatus having an aiming device for aiming at a distant target, means for reproducing the aim thereat with reference to, and recording the same upon, a miniature target or the like, a target magazine for holding a plurality of such miniature targets, said magazine comprising a horizontal casing of rectangular cross-section and having open ends, means acting through one end of said casing for pressing the targets toward the opposite end thereof, a target holder adjacent the exit end of the casing, and means acting transversely the exit end of the casing for transferring said targets singly from the casing to the holder.

12. A target practice apparatus having an aiming device for aiming at a distant target, means for reproducing the aim thereat with reference to, and recording the same upon, a miniature target or the like, a target magazine for holding a plurality of such miniature targets comprising a casing, target feeding mechanism at one end thereof, and means for pressing said targets toward said feeding mechanism.

13. In an apparatus of the class described, the combination of the aiming device 1, the magazine 53 adapted to hold a plurality of targets and provided with a follower block 54 coöperating therewith for positioning said targets therein.

14. In an apparatus of the class described, the combination of the aiming device 1, and recording needle 19, adapted to follow the aim of the aiming device the target holder 33 operatively mounted relative thereto, the target magazine 53, and the feeding slide 59 for removing targets from said magazine and positioning them upon said holder.

15. A target practice apparatus having an aiming device for aiming at a distant target, means for reproducing the aim thereat with reference to, and recording the same upon, a miniature target or the like, means for holding a plurality of such targets unseparated and in bulk, and means for separating and feeding said targets singly from said holding means.

16. In an apparatus of the class described, the combination of the aiming device 1, the recording needle 19, and means comprising the slide 66, the feed slide 59 having a shouldered portion 61 for feeding targets into operative position relative thereto.

17. In an apparatus of the class described, the combination of a target holder, of feeding mechanism for transferring the targets singly to said holder, said mechanism comprising a reciprocating member, means for presenting said targets unseparated against the face of said reciprocating member, said member being provided with means adapted to overlie the edge of the foremost target to engage the same and transfer it to the holder, said means being insufficient, however, to engage the edge of the next adjacent target.

18. A target practice apparatus having an aiming device for aiming at a distant target, means for reproducing the aim thereat with reference to, and recording the same upon, a miniature target or the like, means for holding a plurality of such miniature targets, and means for separating and feeding said targets singly in a downward direction into operative relation with said recording means.

19. A target practice apparatus having an aiming device for aiming at a distant target, means for reproducing the aim thereat with reference to, and recording the same upon, a miniature target or the like, a target holder, a magazine for holding in bulk a plurality of such miniature targets above said holder, and target feeding means for separating and transferring the targets singly from said magazine to said holder.

20. A target practice apparatus having an aiming device for aiming at a distant target, means for reproducing the aim thereat with reference to, and recording the same upon a miniature target or the like, a stationary magazine for holding a plurality of such miniature targets, and means for progressively moving said targets through said magazine.

21. A target practice apparatus having an aiming device for aiming at a distant target, means for reproducing the aim thereat with reference to, and recording the same upon, a miniature target or the like, and a target magazine for holding a plurality of such miniature targets comprising an elongated box-like casing, and a bracket at or near the mouth thereof.

22. A target practice apparatus having an aiming device for aiming at a distant target, means for reproducing the aim thereat with reference to, and recording the same upon, a miniature target or the like, means for holding a plurality of such miniature targets, means for transferring a target from said holding means to its recording position, and separate means for ejecting the preceding target from recording position.

23. A target practice apparatus of the class described, comprising in combination an aiming device having an aiming movement, a target magazine, a target holder, means for feeding a target from said magazine to said holder, and means acting in advance of said target to eject the preceding target from said holder.

24. A target practice apparatus of the class described, comprising in combination an aiming device having an aiming movement, a target magazine, a target holder, reciprocating feeding means for transferring a target from said magazine to said holder, and a pusher member connected to said reciprocating feeding means for ejecting the preceding target from said holder.

25. In an apparatus of the class described, an aiming device, a target holder 33, and means including the feed slide 59 provided with a pusher member 102 for feeding targets thereto.

26. In an apparatus of the class described, the combination with the aiming device 1, the recording needle 19, operatively connected with said aiming device, the target holder 33 adapted to support a target in operative relation relative to said needle, means for feeding targets thereto, and the chute 62 having one end in juxtaposition to said holder.

27. A target practice apparatus having an aiming device for aiming at a distant target, means for reproducing the aim thereat with reference to, and recording the same upon, a miniature target or the like, means for presenting a miniature target to the action of the recording means, a chute beneath the recording position of said target, and means for ejecting said target from its recording position into said chute.

28. In an apparatus of the class described, the combination of an aiming device with a target magazine, a target holder adjacent said magazine, target feeding means for moving targets from said magazine to said holder and a gravity chute having an open end beneath said holder for receiving targets therefrom and to permit their removal from said apparatus.

29. A target practice apparatus having an aiming device for aiming at a distant target, means for reproducing the aim thereat with reference to, and recording the same upon, a miniature target or the like, a target holder, means for presenting a target therein to the action of the recording devices, and means for ejecting a target downwardly from the holder.

30. In an apparatus of the class described, the combination with a target holder having a longitudinally grooved pad or backing, of a reciprocatory pusher member comprising a plate and flanged sides provided with one or more notches to engage the upper edge of the target and cause its ejection from the holder.

31. A target practice apparatus having an aiming device for aiming at a distant target, means for reproducing the aim thereat with reference to, and recording the same upon, a miniature target or the like, a target magazine for holding a plurality of such miniature targets comprising a casing of rectangular cross-section provided with hinged sides to permit its ready opening and to facilitate the insertion of the targets.

32. A target practice apparatus employing an aiming device and a sub- or miniature target, means for recording the aim upon the sub-target, a target magazine, target feeding means for replacing the sub-target in its recording position by another from the said magazine, and means for preventing the operation of said feeding means when the magazine is exhausted.

33. In an apparatus of the class described, the combination of the aiming device 1, the recording needle 19, the magazine 53, and means comprising the presser block 54 movably mounted in said magazine having a projection 95, and the feed slide 59 for feeding targets into recording position.

34. A target practice apparatus having an aiming device for aiming at a distant target, means for reproducing the aim thereat with reference to, and recording the same upon, a miniature target or the like, a target holder and a stationary magazine for holding a plurality of such miniature targets above said holder.

In testimony whereof, I have signed my name to this specification, in the presence of two subscribing witnesses.

HENRY A. STEBBINS.

Witnesses:
 THOMAS B. BOOTH,
 EDITH E. CHAPMAN.